United States Patent
Meininger

(10) Patent No.: US 7,466,909 B2
(45) Date of Patent: Dec. 16, 2008

(54) SYSTEM FOR CODING A RECORDED IMAGE, AND METHOD THEREFOR

(75) Inventor: Peter Cornelis Meininger, Utrecht (NL)

(73) Assignee: Maxifoto International B.V. (AN)

( * ) Notice: Subject to any disclaimer, the term of this patent is extended or adjusted under 35 U.S.C. 154(b) by 0 days.

(21) Appl. No.: 10/556,523

(22) PCT Filed: Jan. 13, 2005

(86) PCT No.: PCT/NL2005/000015

§ 371 (c)(1),
(2), (4) Date: Feb. 9, 2007

(87) PCT Pub. No.: WO2005/069202

PCT Pub. Date: Jul. 28, 2005

(65) Prior Publication Data

US 2007/0172225 A1 Jul. 26, 2007

(30) Foreign Application Priority Data

Jan. 13, 2004 (NL) .................................. 1025222

(51) Int. Cl.
*G03B 15/00* (2006.01)
(52) U.S. Cl. .............................. 396/2; 396/429; 705/14
(58) Field of Classification Search ..................... 396/2, 396/429; 705/14
See application file for complete search history.

(56) References Cited

U.S. PATENT DOCUMENTS

| 5,694,514 A * | 12/1997 | Evans et al. .................... 386/46 |
| 6,233,399 B1 * | 5/2001 | Walter ............................ 396/2 |
| 6,490,409 B1 * | 12/2002 | Walker ......................... 386/117 |
| 6,526,158 B1 * | 2/2003 | Goldberg ..................... 382/115 |
| 2002/0008622 A1 * | 1/2002 | Weston et al. ............ 340/572.1 |
| 2002/0030745 A1 * | 3/2002 | Squilla et al. ................ 348/207 |
| 2002/0049728 A1 * | 4/2002 | Kaku ............................. 707/1 |
| 2002/0067408 A1 * | 6/2002 | Adair et al. .................... 348/76 |
| 2002/0077938 A1 * | 6/2002 | Shen ........................... 705/29 |
| 2002/0095477 A1 * | 7/2002 | Hirata et al. ................. 709/217 |
| 2003/0182143 A1 * | 9/2003 | Conrad et al. .................. 705/1 |

FOREIGN PATENT DOCUMENTS

| WO | WO98/10358 A | 3/1998 |
| WO | WO03/043315 A | 5/2003 |

* cited by examiner

*Primary Examiner*—W. B. Perkey
*Assistant Examiner*—Michael A Strieb
(74) *Attorney, Agent, or Firm*—McDermott Will & Emery LLP

(57) ABSTRACT

The present invention provides a method for making, viewing and/or ordering a photographic image, comprising the following steps of:—making a recorded image with a digital camera;—wirelessly sending the image, immediately after it has been made, to a processing unit for processing of the digital data from the digital camera; and—wirelessly sending a code to a printing unit during processing of the digital data, which printing unit is disposed close to or at a predetermined distance from a digital camera, wherein the person of whom an image is made receives a receipt with a code with which he/she can view and/or order the recorded image.

10 Claims, 2 Drawing Sheets

SYSTEM FOR CODING A RECORDED IMAGE, AND METHOD THEREFOR

Figure 1:
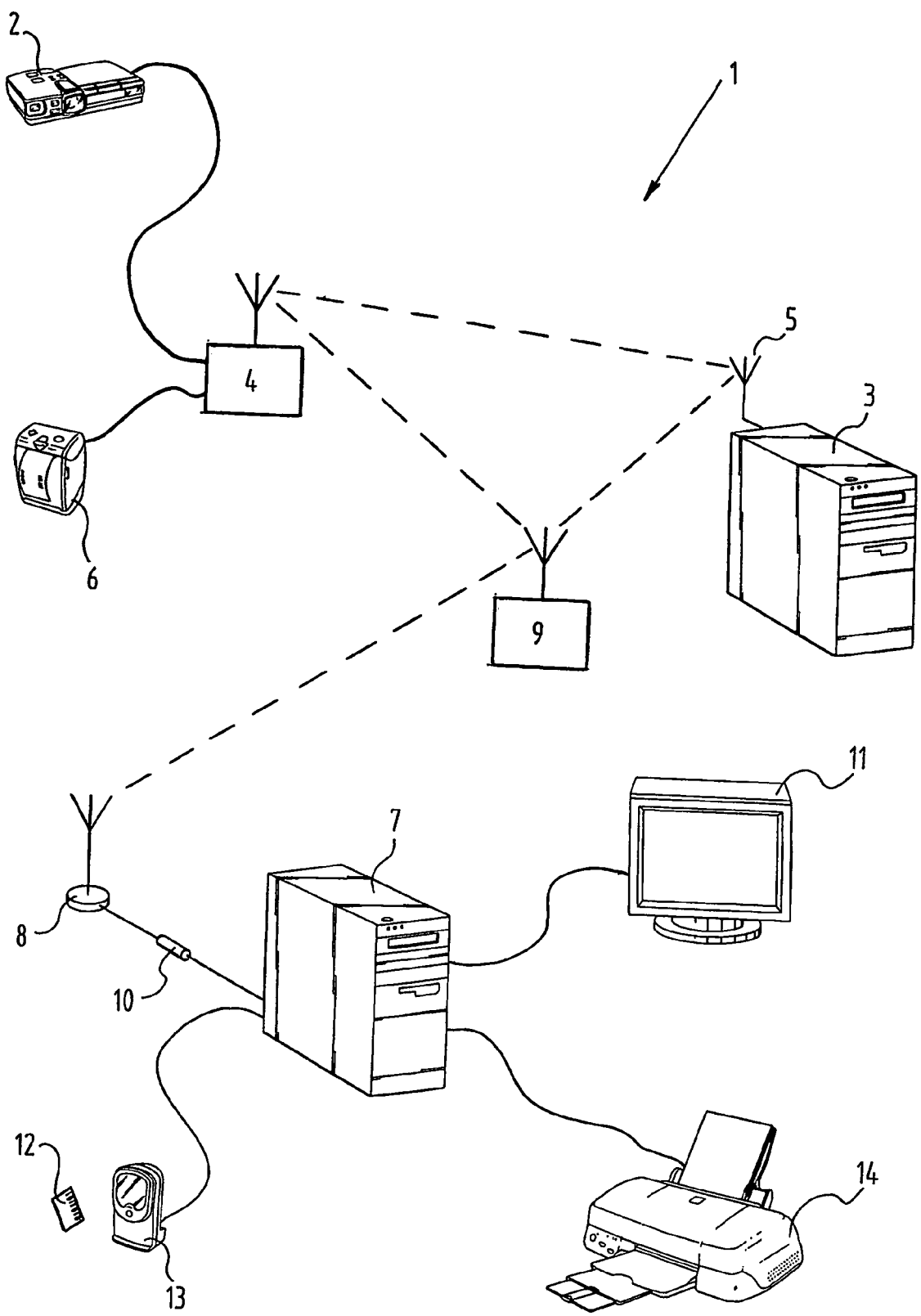

This application claims priority from PCT Application No. PCT/NL2005/000015, filed 13Jan. 2005 (incorporated by reference herein) and Dutch Application No. 1025222, filed 13 Jan. 2004 (incorporated by reference herein).

It has been usual for a number of years now that visitors to amusement parks and zoos are awaited at the entrance by one or more photographers who makes photos of them. The photo taken is then developed and can later be purchased.

WO-98/10358-A describes a method and system for obtaining person-specific images at a public venue. A person entering the amusement park is provided for this purpose with a remotely readable code.

WO-01/043315-A describes a method and device for providing automatic access to images recorded at different locations. The person is provided with a person-specific code, this being a so-called RFID.

The published American application US-2002/0008622-A describes a system and method for automatically making photo and video recordings and retrieving thereof by means of RFID codes which identify a specific person or a group.

All the above stated systems and methods have the drawback that a visitor to an amusement park, conference or the like must be provided with an identification or tag before photos can be made and retrieved, viewed and ordered. This is generally perceived as inconvenient, while it can also entail considerable cost, particularly in the case of so-called RFID tags.

The present invention provides a method for making, viewing and/or ordering a photographic image, comprising the following steps of:

making a recorded image with a digital camera;

wirelessly sending the image, immediately after it has been made, to a processing unit for processing of the digital data from the digital camera; and wirelessly sending a code to a printing unit during processing of the digital data, which printing unit is disposed close to or at a predetermined distance from a digital camera, wherein the person of whom an image is made receives a receipt with a code with which he/she can view and/or order the recorded image.

With the method according to the present invention a receipt can be provided within a very short time to an individual—after he/she has been asked whether he/she would like to have a photo taken—which bears the number of his/her photo. Particularly at ski-lifts, roller coasters and the like a photo can also be made and the receipt handed out in the correct sequence at the exit to such a ride. At the bottom of the ski-lift or roller coaster the photo can then already be viewed on a preferably large screen, whereafter the photo can be ordered there or at home via the internet.

The present invention further provides a system, comprising:

a camera for making recorded images;

a WLAN transmitter/receiver for sending the recorded image;

a central processing unit in the WLAN for receiving and processing the recorded image and for assigning thereto a code for identification of the image; and a code printer incorporated in the WLAN for printing on a receipt the code generated by the processing unit.

By means of such a system it becomes simpler for the customer to retrieve the correct image, for instance a photo or film. Ordering is also possible via a network and/or via the internet. Preferably only the photos which are ordered are printed.

A greater flexibility is obtained by setting up a wireless communication between the components, as well as a greater freedom of movement for the photographer. The processing unit can further be arranged at a central point, whereby it can have a greater power, and therefore more possibilities.

In a further preferred embodiment, the system comprises a code reader for reading the code on the receipt and displaying the associated image on a screen in response to the read code.

Figure 2:
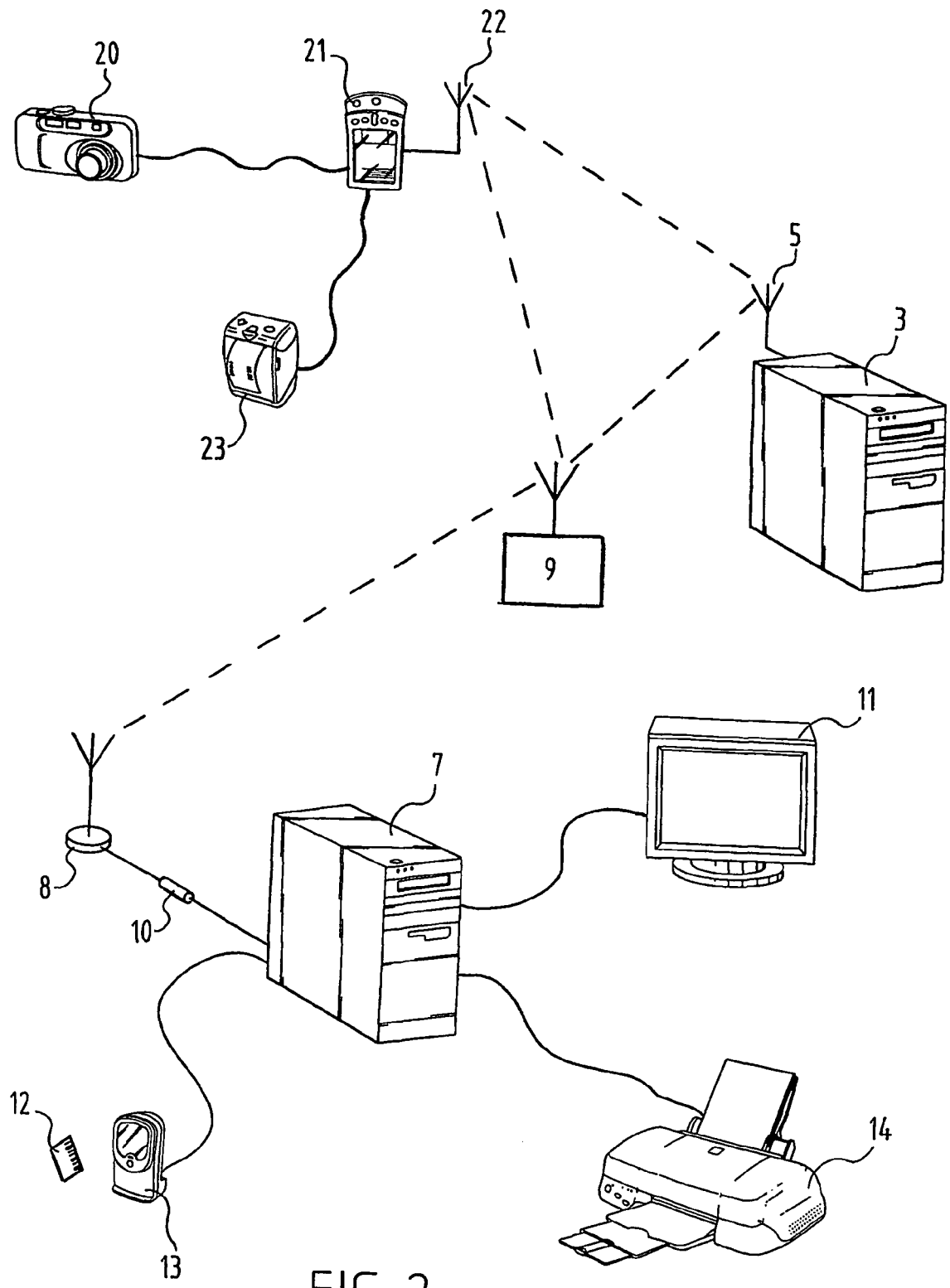

Further advantages and features of the present application will be elucidated with reference to the accompanying figures, in which:

FIG. 1 shows a schematic overview of a system for coding images according to the present application in a first preferred embodiment; and FIG. 2 shows a schematic overview of a system for coding images according to the present application in a second preferred embodiment.

A system 1 comprises a (photo) camera for making images therewith, such as photos or a film. Immediately after being made, the recorded image is transmitted via a network to a central processing unit such as computer 3. The transmission preferably takes place wirelessly. To this end the camera 2 transmits the image to a transmitter/receiver 4 which sends the image digitally and wirelessly to antenna 5 of computer 3. The central computer 3 assigns a code to the image when it is received and processes this code into a barcode. The code is then sent back, again preferably wirelessly, to barcode printer 6 via transmitter/receiver 4. Barcode printer 6 then prints the barcode, together with a number code, onto a receipt. Barcode printer 6 can preferably also print on the receipt other information about the recorded image, such as time, date, location and an advertising text. The printed receipt is given to the customer as identification means with which the customer can view and buy the image at a later time.

The recorded image, via the barcode assigned thereto, can also be sent to a second processing unit, such as computer 7 at a retail point. This transmission preferably takes place wirelessly, wherein the distances between computer 3, transmitter/receiver 4 and computer 7 with associated reception antenna 8 can be varied in virtually unlimited manner through the use of suitable transmitters and receivers. The distance can optionally be increased by placing a second transmitter/receiver 9 between computer 3 and computer 7 for amplifying and further transmitting the digitized signal. After the signal has been received at antenna 8, it is passed on via a cable 10 to computer 7. The recorded image can be presented on a display screen 11. It is also possible to only display the photo on screen 11 when the receipt 12 with the barcode thereon is held in front of a barcode reader 13. The customer can then view on the screen and optionally order the associated image. If the image is ordered, this can be processed immediately by computer 7, which causes the image to be printed out on printer 14. The first and second processing units 3 and 7 can likewise be combined in one computer.

Applications of a system for making photos according to the present invention lie particularly in the photographing of visitors to recreation parks, wherein the visitors are photographed as they enter or at specific rides, for instance at exciting points thereof such as at a steep descent on a roller coaster. The photographer can give the receipt 12 to the customer as they leave the rides or as they enter the amusement park. The option of viewing, and optionally ordering, the image associated with receipt 12 is provided on screen 11.

Other applications, wherein the system operates in accordance with the above described method in amusement parks, are (trade) fairs, congresses and events. At a (car) show for instance, the visitors are photographed, wherein not only a barcode is added to the photo but also address data of the visitor, so that the photo that has been taken can be viewed at a later time or can be sent to the home address of the visitor. In addition to amusement parks, it is also possible to envisage zoos, wherein the visitor is photographed at the entrance or with an animal of choice. There is also the option of viewing the image later, for instance via the internet, by entering the code printed on receipt 12, whereafter the image can optionally be ordered straightaway.

Other possibilities of the system relate to displaying a plurality of photos simultaneously on the display screen 11 for a greater throughput speed. It is possible to envisage a split screen wherein four photos at a time can be displayed, so that four customers can view their photo simultaneously. The further option can be added of arranging a second image over the photo for decorative purposes, or of adding for instance a background to the photo. In yet another preferred embodiment, it is possible to embody screen 11 as a touch-sensitive screen. A customer can then for instance order the photo immediately by touching the screen at determined positions to which a predetermined function has been assigned, wherein the option of ordering associated products is also offered. Here can be envisaged discount vouchers and products related to the recreation park or the fair visited, such as for instance soft toys or miniature cars.

In a practical embodiment the system is embodied by making use of a digital camera suitable for a wireless network connection. This makes use of for instance the wireless protocol 802.11 b/g (WLAN or WiFi). Suitable cameras are for instance the Ricoh RDCi-700 or the Nikon D2 H. The computers 3 and 7 used can be standard commercially available PCs provided with an antenna suitable for the above stated wireless protocol. The barcode printer is for instance of the Cognitive brand, Code Ranger type ZEBRA QL320, or EXTECH which is likewise suitable for use with a wireless network (WLAN). When applied in an amusement park, a photographer carries the camera and the (bar)code printer with him, as well as the transmitter/receiver 4 for the wireless network. The transmitter/receiver 4 is for instance a PCMCIA card of the Buffalo brand, type WLI-PCM-L11 GP, or WiFi Client Adapter, Orinoco Classic Gold which is used in combination with the camera. Barcode printer 6 is then provided with a transmitter/receiver of the Symbol brand, type Spectrum 24. The wireless network is set up for instance with wireless transmitters and receivers of the Cisco brand, with a wireless access point AIR-AP1210 or WiFi Access Point Orinoco AP4000, AP700, in combination with an antenna 5 from Cisco of the type AIR-ANT24120 or Orinoco 2.4 Ghz, or Omni Antenna 5 dbi. The cables 10 used are for instance of the Cisco type AIR-CAB020 LL-R or the Cisco type AIR-CAB050 LL-R. A lightning arrester (not shown) of the Cisco brand, AIR-ACC3354, can further be arranged between antennas 5,8 and computers 3,7 in order to protect the equipment from lightning strike. The barcode reader 13 used is for instance from PSC, type VS800.

In a second embodiment, camera 20 is connected via a cable—or wireless, e.g. through Bluetooth—to a pocket computer 21 such as a PDA. Pocket computer 21 sends the image via an antenna 22 to a central computer 3 at a retail point. It is possible here for the pocket computer to generate a code during the recording and to send this together with the image. The central computer 3 preferably generates the code and sends it back to pocket computer 21. A printer 23 is herein connected via a cable—or wireless through Bluetooth—to the pocket computer, so that a receipt 12, having thereon the code in the form of a barcode combined with a number code, is printed directly and given to the customer.

The second embodiment has the advantage that more cameras are suitable, there is a wider choice than in the case of cameras suitable for a network card. A digital camera can be connected to the pocket computer, for instance a PDA, via a digital output, for instance a USB port. The pocket computer sends the information via a wireless network card. Printer 6 can be connected with a cable or through Bluetooth to the pocket computer so that the choice of printers is greater. The photographer carries the pocket computer and printer 23. These are attached to each other with a clip or arranged together in special bags on a belt.

The present invention is not limited to the above described preferred embodiments thereof, wherein many modifications can be envisaged which fall within the scope of the following claims.

The invention claimed is:

1. Method for making, viewing and, optionally ordering one or more photographic images, comprising the following steps of:
    making a recorded image with a mobile digital camera;
    wirelessly sending the image, immediately after it has been made, to a processing unit for processing of the digital data from the digital camera; and
    exchanging a code between the processing unit and an issue location to a printing unit during processing of the digital data, which issue location is close to or at a predetermined distance from the digital camera, wherein a person of whom an image is made receives a receipt with the code with which he/she can view and, optionally order the recorded image.

2. The method as claimed in claim 1, wherein wireless transmission takes place within a WLAN (Wireless Local Area Network) wherein the digital camera or the printing unit is provided with a WiFi antenna.

3. The method as claimed in claim 1, wherein the digital camera or the printing unit are connected to a Personal Digital Assistant (PDA) which is also provided with means for wireless communication.

4. A system for coding a recorded image, comprising:
    a camera for making the recorded image;
    a transmitter/receiver for sending the recorded image;
    a central processing unit for receiving and processing the recorded image and for assigning thereto a code for identification of the image; and
    a code printer for printing on a receipt the code generated by the processing unit.

5. The system as claimed in claim 4, also comprising means for wireless communication in accordance with a WLAN or WiFi protocol between the camera, the central processing unit, and the code printer.

6. The system as claimed in claim 5, also comprising a code reader for reading the code on the receipt and displaying the associated image on a screen in response to the read code.

7. The system as claimed in claim 6, also comprising printing means for printing the recorded image associated with the code.

8. The system as claimed in claim 4, wherein the camera, processing unit and code printer communicate wirelessly with each other over a relatively large distance, for instance in the order of magnitude of about 3 km.

9. The method of claim 1, wherein the code is issued by a printer unit disposed close to the digital camera, the code being transmitted wirelessly to the printer.

10. A method for obtaining one or more photographic images for use by a person at a ski resort, the method comprising the steps of:
- making a recorded image with a digital camera;
- sending the image via a cable, immediately after it has been made, to a processing unit for processing of the digital data from the digital camera; and
- exchanging a code between the processing unit and an issue location to a printing unit during processing of the digital data, which issue location is close to or at a predetermined distance from the digital camera, wherein the person of whom an image is made receives a receipt with this code with which he/she can view and/or order the recorded image.

* * * * *

UNITED STATES PATENT AND TRADEMARK OFFICE
CERTIFICATE OF CORRECTION

PATENT NO.         : 7,466,909 B2
APPLICATION NO.    : 10/556523
DATED              : December 16, 2008
INVENTOR(S)        : Peter Cornelis Meininger Page 1 of 1

It is certified that error appears in the above-identified patent and that said Letters Patent is hereby corrected as shown below:

Title Page item [73]
Please correct the name and address of the Assignee to be:

Maxifoto International N.V.
Kaya W.F.G. (Jombi) Mensing 14
Curacao
Netherlands Antilles Signed and Sealed this Second Day of June, 2009

JOHN DOLL
*Acting Director of the United States Patent and Trademark Office*